US007471417B1

(12) United States Patent
Chien

(10) Patent No.: US 7,471,417 B1
(45) Date of Patent: Dec. 30, 2008

(54) METHOD AND APPARATUS FOR LOCATING A SOURCE POINT FOR AN IMAGE-RETOUCHING TOOL

(75) Inventor: Jen-Chan Chien, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 713 days.

(21) Appl. No.: 11/084,347

(22) Filed: Mar. 17, 2005

(51) Int. Cl.
*H04N 1/60* (2006.01)

(52) U.S. Cl. .................. 358/1.9; 358/531; 358/448; 358/453; 382/254; 345/581

(58) Field of Classification Search ............... 358/1.9, 358/500, 531, 523, 513, 448, 452, 453; 382/254, 382/190, 275, 172; 345/582, 150, 581; 348/251, 348/246
See application file for complete search history.

(56) References Cited

U.S. PATENT DOCUMENTS

| | | | | |
|---|---|---|---|---|
| 4,484,230 | A * | 11/1984 | Pugsley | 358/447 |
| 5,488,674 | A | 1/1996 | Burt et al. | |
| 5,555,194 | A * | 9/1996 | Cok | 382/254 |
| 5,572,607 | A * | 11/1996 | Behrends | 382/274 |
| 5,694,228 | A * | 12/1997 | Peairs et al. | 358/538 |
| 6,014,471 | A * | 1/2000 | Barkan et al. | 382/275 |
| 6,128,411 | A | 10/2000 | Knox | |
| 6,151,029 | A | 11/2000 | Shirman | |
| 6,583,823 | B1 | 6/2003 | Shimada et al. | |
| 6,756,989 | B1 | 6/2004 | Morgan et al. | |
| 6,850,644 | B1 * | 2/2005 | Shin et al. | 382/190 |
| 6,996,287 | B1 | 2/2006 | Weiss | |
| 2002/0154831 | A1 * | 10/2002 | Hansen et al. | 382/257 |
| 2003/0012452 | A1 * | 1/2003 | Trifonov et al. | 382/275 |

OTHER PUBLICATIONS

"Synthesizing Realistic Facial Expressions From Photographs", Pighin, Hecker, Lischinski, Szeliski and Salesin; ACM SIGGRAPH 2005 Courses SIGGRAPH '05.
"Image-Based Modeling and Photo Editing"; Oh, Chen, Dorsey and Durand, Laboratory for Computer Science; Massachusetts Institute of Technology, Proceedings of the 28th annual conference on computer graphics and interactive techniques SIGGRAPH '01.

(Continued)

*Primary Examiner*—Kimberly A Williams
(74) *Attorney, Agent, or Firm*—Robert C. Kowert; Meyertons, Hood, Kivlin, Kowert & Goetzel, P.C.

(57) ABSTRACT

One embodiment of the present invention provides a system that automatically locates a source point within an image for an image-retouching tool. During operation, the system receives an image, wherein the image includes a defective area. Next, the system determines visual characteristics for the defective area. The system then searches around the defective area to identify candidate replacements for the defective area, and also determines visual characteristics for the candidate replacements. Next, the system compares visual characteristics of the defective area with visual characteristics for the candidate replacements to select a candidate replacement to be used as the source point from which pixels can be copied by the image-retouching tool. Note that this system not only improves the usability of image-retouching tools, but can also improve the quality of the result.

21 Claims, 5 Drawing Sheets

OTHER PUBLICATIONS

Peter J. Burt and Edward H. Adelson, "The Laplacian Pyramid as a Compact Image Code," *IEEE Transactions on Communications*, Apr. 1983, pp. 532-540, vol. 31, No. 4.

Daniel L. Ruderman, Thomas W. Cronin and Chuan-Chin Chiao, "Statistics of Cone Responses to Natural Images: Implications for Visual Coding," *Journal of the Optical Society of America A*, Aug. 1998, pp. 2036-2045, vol. 15, No. 8.

Rudolf K. Bock, "F Test," http://rkb.home.cern.ch/rkb/AN16pp/node81.html, Apr. 7, 1998.

* cited by examiner

METHOD AND APPARATUS FOR LOCATING A SOURCE POINT FOR AN IMAGE-RETOUCHING TOOL

BACKGROUND

1. Field of the Invention

The present invention relates to computer-based tools for manipulating digital images. More specifically, the present invention relates to a method and an apparatus for locating a source sampling point within an image for an image-retouching tool.

2. Related Art

Unlike conventional film-based images, digital images can be loaded onto a computer system. This allows the digital images to be edited and otherwise manipulated by digital editing tools, such as image-retouching tools.

Image-retouching tools, such as a "clone stamp tool" or a "healing brush," can be used to fix defects within an image, such as, dust, mold, film grain, etc. For example, a "clone stamp tool" allows a user to copy pixels from a source point in the image to a destination point in the image to cover up defects at the destination point. A "healing brush" also allows a user to copy pixels from a source point to a destination point, but it additionally fixes boundary transitions at the destination point to ensure that the copied pixels blend seamlessly with surrounding pixels at the destination point.

The process of using these image-retouching tools can be very time-consuming, because there are often a large number of small artifacts to be removed from an image. Furthermore, the quality of the result depends on the choice of a "source sampling point," which is the location in the image from which pixels are copied by the image-retouching tool.

At present, the source sampling point for each defective area is selected through a time-consuming manual selection process. During this manual selection process, the user often has a hard time selecting an optimal source sampling point because the optimal source sampling points is often located very close to defective area. In practice, users have a difficult time identifying source sampling points in close proximity to defective areas, because they have to zoom in on the defective area, and because they have a hard time differentiating the source sampling point from the defective area.

Hence, what is needed is a method and an apparatus for locating source sampling points without the time-consuming manual process described above.

SUMMARY

One embodiment of the present invention provides a system that automatically locates a source point within an image for an image-retouching tool. During operation, the system receives an image, wherein the image includes a defective area. Next, the system determines visual characteristics for the defective area. The system then searches around the defective area to identify candidate replacements for the defective area, and also determines visual characteristics for the candidate replacements. Next, the system compares visual characteristics of the defective area with visual characteristics for the candidate replacements to select a candidate replacement to be used as the source point from which pixels can be copied by the image-retouching tool. Note that this system not only improves the usability of image-retouching tools, but can also improve the quality of the result.

In a variation on this embodiment, determining visual characteristics for the defective area involves computing a mean value and a standard deviation along each axis of a color space for pixels in the defective area.

In a further variation, the color space is the 1-alpha-beta color space (or the LAB color space), and the system converts the defective area from a source color space (such as the RGB color space, the CMYK color space or the Grayscale color space) to the 1-alpha-beta color space (or the LAB color space) before the mean values and standard deviations are computed. Note that the 1-alpha-beta color space and the LAB color space tend to minimize correlation between channels for natural scenes. Furthermore, note that while converting a Grayscale image to an 1-alpha-beta image, the Grayscale image can be treated as an 1-alpha-beta image with just an "1" channel.

In a variation on this embodiment, comparing visual characteristics of the defective area with visual characteristics of the candidate replacements involves performing an F-test to compare standard deviations for the visual characteristics being compared.

In a variation on this embodiment, comparing visual characteristics of the defective area with visual characteristics of the candidate replacements involves performing a T-test to determine whether visual characteristics being compared have significantly different mean values.

In a variation on this embodiment, identifying candidate replacements involves filtering out candidate replacements having mean values which do not substantially match the mean value for the defective area, whereby subsequent comparison operations can be avoided for candidate replacements which have been filtered out.

In a variation on this embodiment, searching around the defective area to identify candidate replacements involves examining candidate replacements in a region bounding the defective area.

In a variation on this embodiment, determining the visual characteristics for the defective area involves excluding defects from the defective area while determining the visual characteristics.

In a variation on this embodiment, the image-retouching tool is a clone stamp tool, which allows a user to copy pixels from a source point in the image to a destination point in the image.

In a variation on this embodiment, the image-retouching tool is a healing brush, which allows a user to copy pixels from a source point in the image to a destination point in the image, and which additionally ensures that the copied pixels blend seamlessly with surrounding pixels at the destination point.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system, or an embedded system such as a digital camera. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Overview

One embodiment of the present invention provides an effective technique for automatically locating a source data sampling point for a image-retouching tool, such as a healing brush or a clone stamp tool, which operates by copying pixels from one part of an image to another part of the image. During operation, this technique analyzes regions surrounding the defective area to identify a good replacement, without time-consuming manual operations. This technique not only improves the usability of image-retouching tools, such the healing brush, but can also improve the quality of the resulting retouched image.

Image-Retouching Tool

Figure 1:
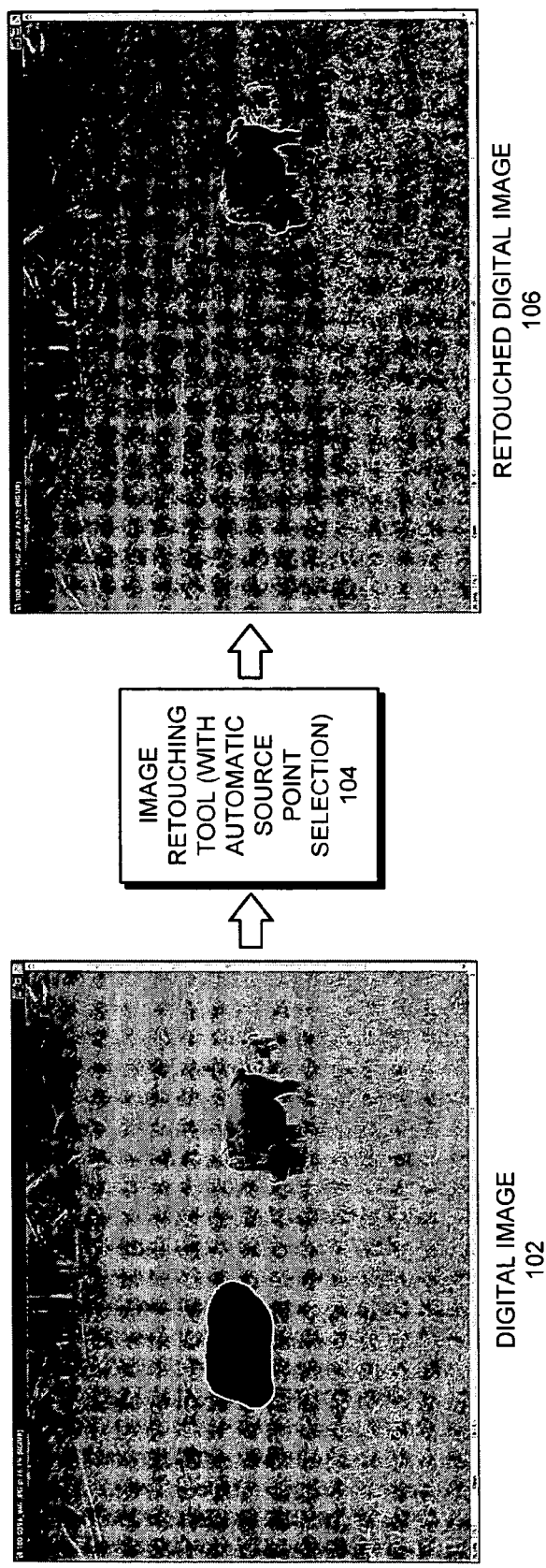
FIG. 1 illustrates an image-retouching tool in accordance with an embodiment of the present invention.

FIG. 1 illustrates an image-retouching tool 104 in accordance with an embodiment of the present invention. Image-retouching tool 104 takes as input a digital image 102 and produces a retouched digital image 106. Digital image 102 can include any type of digital image which is comprised of pixels, such as an image produced by a digital camera or a scanned image. During the retouching process, image-retouching tool 106 automatically selects a source point within digital image 102 from which pixels will be copied by image-retouching tool 106. (In general, a "source point" for an image-retouching tool is a sub-region within an image from which pixels will be copied by the image-retouching tool to a target region within the image.)

In order to select a source point, one embodiment of the present invention characterizes a defective area in the image, and then searches for a replacement with the closest matched characteristics to the defective area. Since both the noise and the structure of the data are important, one embodiment of the present invention characterizes the defective area by computing a mean value and a standard deviation for the defective area along each axis of a color space.

For a RGB image (or a CMYK image or a Grayscale image), using the mean value and standard deviation of each color axis to characterize the data is not very effective because of correlations between the different channels' values. Hence, one embodiment of the present invention first converts the pixel data for an image from a source color space (such as the RGB color space, the CMYK color space or the Grayscale color space) to the "1-alpha-beta" color space (or LAB color space) which has been shown to minimize the correlation between channels (for a representative sample of pictures people have taken) before computing the mean values and standard deviations for each color axis.

Note that these computations can be effectively performed at a higher pyramid of the commonly used image pyramid data structure because the computed statistics are scale-invariant. In this way, we can speed up the computations. (For a description of the image pyramid data structure, see Peter J. Burt and Edward H. Adelson, "The Laplacian Pyramid as a Compact Image Code," *IEEE Transactions on Communication* 31, no. 4 (1983) 532-540.)

Candidate Replacements

Figure 2:
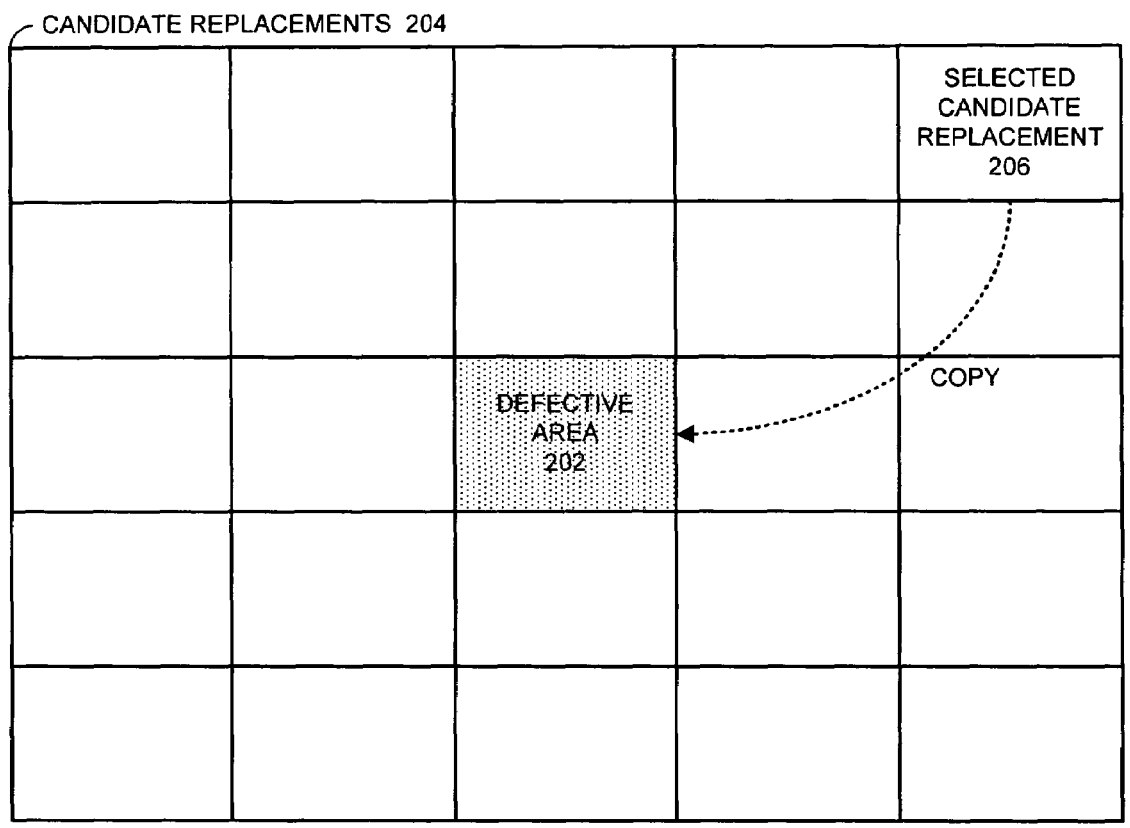
FIG. 2 illustrates candidate replacements for a defective area in accordance with an embodiment of the present invention.

In one embodiment of the present invention, the system searches around the defective area for a replacement for the defective area. For example, FIG. 2 illustrates how the system considers rectangles bounding defective area 202 as candidate replacements. During this process, characteristics of the candidate replacements 204 are compared with characteristics of the defective area 202 to select a candidate replacement 206 with the closest matching characteristics. This selected candidate replacement 206 is then used by an image-retouching tool (such as a clone stamp tool, a healing brush, or a spot healing brush) to overwrite defective area 202 (as is illustrated by the dashed line).

Note that defective area 202 can include any sub-region within an image which is selected by a user to be overwritten by an image-retouching tool.

Operation of Image-Retouching Tool

Figure 3:
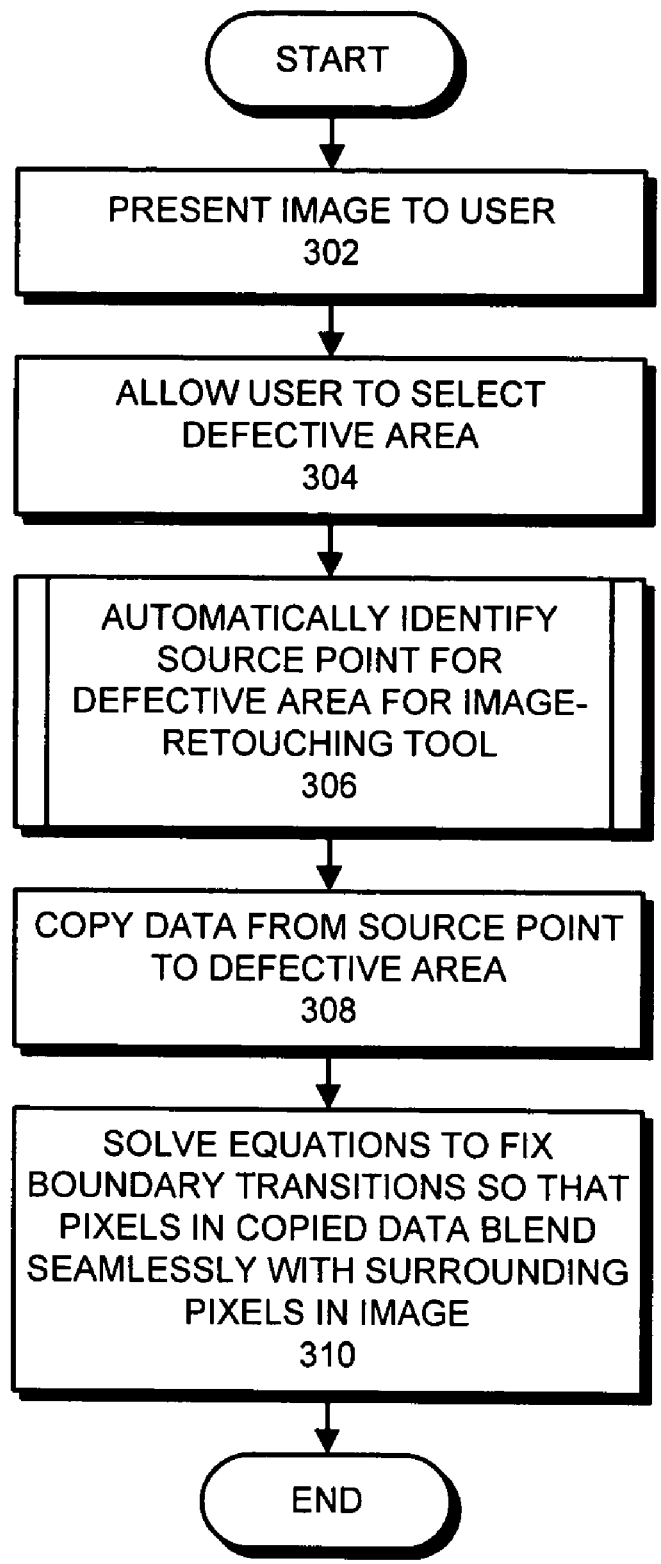
FIG. 3 presents a flow chart illustrating how an image-retouching tool operates in accordance with an embodiment of the present invention.

FIG. 3 presents a flow chart illustrating how an image-retouching tool operates in accordance with an embodiment of the present invention. As was mentioned above, this image-retouching tool can include any type of image-retouching tool that copies pixels from a source point in the image to a destination point in the image, such as a clone stamp tool or a healing brush. During operation, the system presents an image to a user (step 304) through some type of user interface which allows the user to select a defective area (step 304).

Next, the system automatically identifies a source point for the image-retouching tool (step 306). This process is described in more detail below with reference to FIG. 4.

The system then copies data from the identified source point to the defective area (step 308). If the image-retouching tool is a healing brush, the system also solves equations to fix boundary transitions so that the copied pixels blend seamlessly with surrounding pixels in the image (step 310).

Source Point Selection Process

Figure 4:
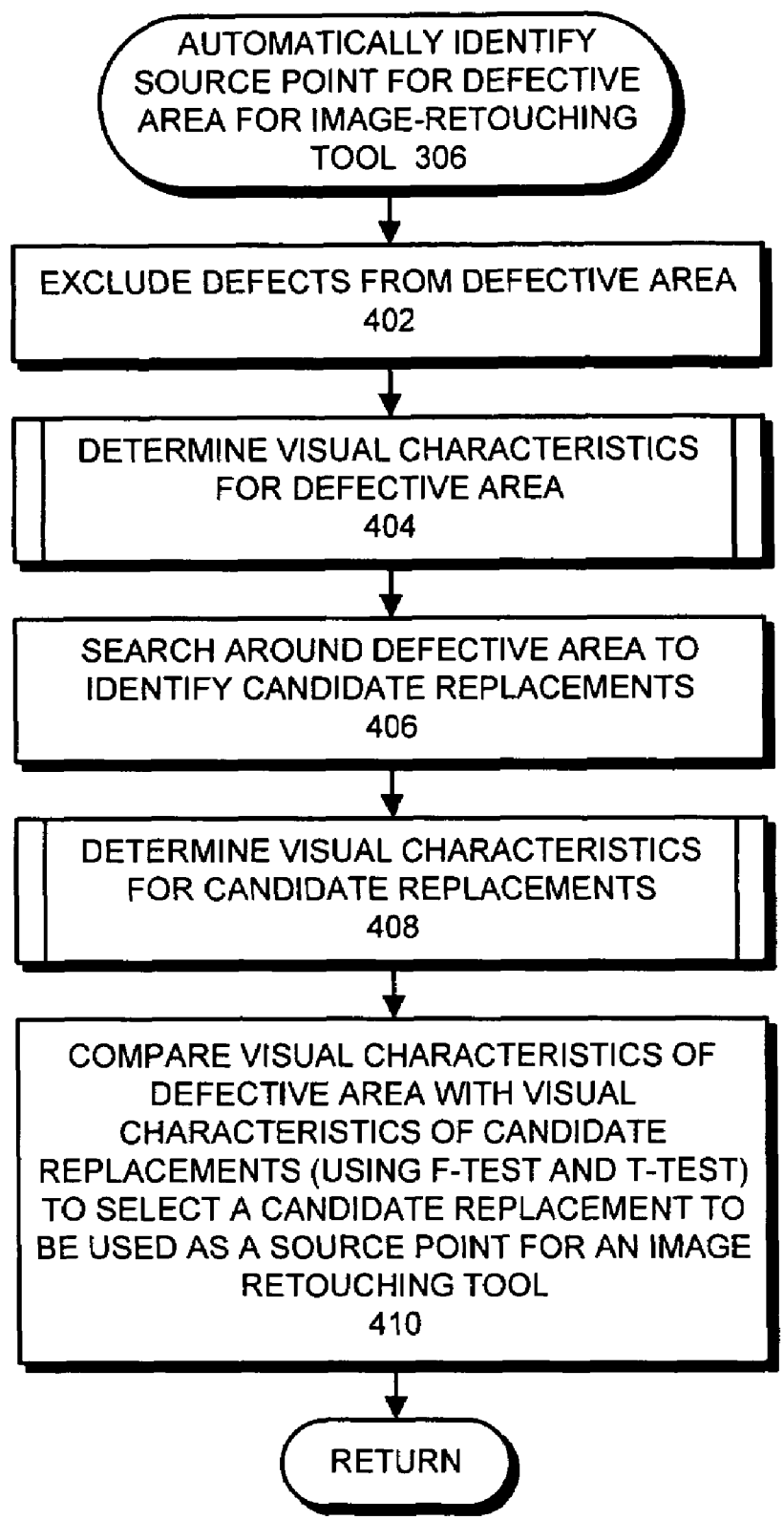
FIG. 4 presents a flow chart illustrating how a source point for an image-retouching tool is selected in accordance with an embodiment of the present invention.

FIG. 4 presents a flow chart illustrating how a source point for an image-retouching tool is selected in accordance with an embodiment of the present invention. This flow chart illustrates in more detail the operations performed within step 306 in the flow chart that appears in FIG. 3. The system first excludes defects (such as scratch marks or dust) from the defective area (step 402). In one embodiment of the present invention, the system relies on the user to identify the defects within the defective area. In another embodiment, the defects are identified automatically by the system.

Next, the system determines visual characteristics for the defective area (with the defects excluded) (step 404). This involves computing a mean value and a standard deviation for the defective area along each axis of a color space as is described in more detail below with reference to the flow chart in FIG. 5.

The system then searches around the defective area to identify candidate replacements (step 408), and also determines visual characteristics for the candidate replacements (step 410). In one embodiment of the present invention, the candidate replacements are automatically selected from locations in the image that immediately surround the defective area as is illustrated in FIG. 2. In another embodiment, candidate replacements are selected from another region of the image, wherein this other region is automatically determined by the system. This process is also described in more detail with reference to the flow chart in FIG. 5.

Next, the system compares the visual characteristics of the defective area with the visual characteristics of the candidate replacements to select a candidate replacement to be used as a source point from which the image-retouching tool will copy pixels to the defective area (step 410).

In one embodiment of the present invention, the system compares the standard deviations by using an F-test, which determines whether two data sets have significantly different standard deviations. (The F-test is a well-known comparison technique, see Snedecor, George W. and Cochran, William G. (1989), Statistical Methods, Eighth Edition, Iowa State University Press.)

The system also compares the mean values by doing a T-test, which determines whether two sample data have significantly different mean values. The T-test is a well-known comparison technique, which compares the actual difference between two means in relation to the variation in the data (expressed as the standard deviation of the difference between the means).

Both F-test and T-test take two data samples and return probabilities indicating whether the two data samples are significantly the same. Small values of these probabilities indicate that two samples have significantly different standard deviations or mean values. The system attempts to select a candidate replacement, which has the least different standard deviations from the defective area. However, if the selected candidate replacement still has a significantly different standard deviation, the system the selects the candidate replacement which has the least different mean values as a backup choice.

In one embodiment of the present invention, before the F-test or the T-test is performed, the system filters out candidate replacements having mean values which do not substantially match the mean value for the defective area. In this way, subsequent comparison operations can be avoided for candidate replacements which have been filtered out. This filtering process can be accomplished by performing a flood fill around the defective area of the image using the mean color (with possibly a user-defined or empirically determined uncertainty factor which defines a band around the mean color). This produces a selection criterion which can be used to search for the replacement.

Process of Computing Visual Characteristics

Figure 5:
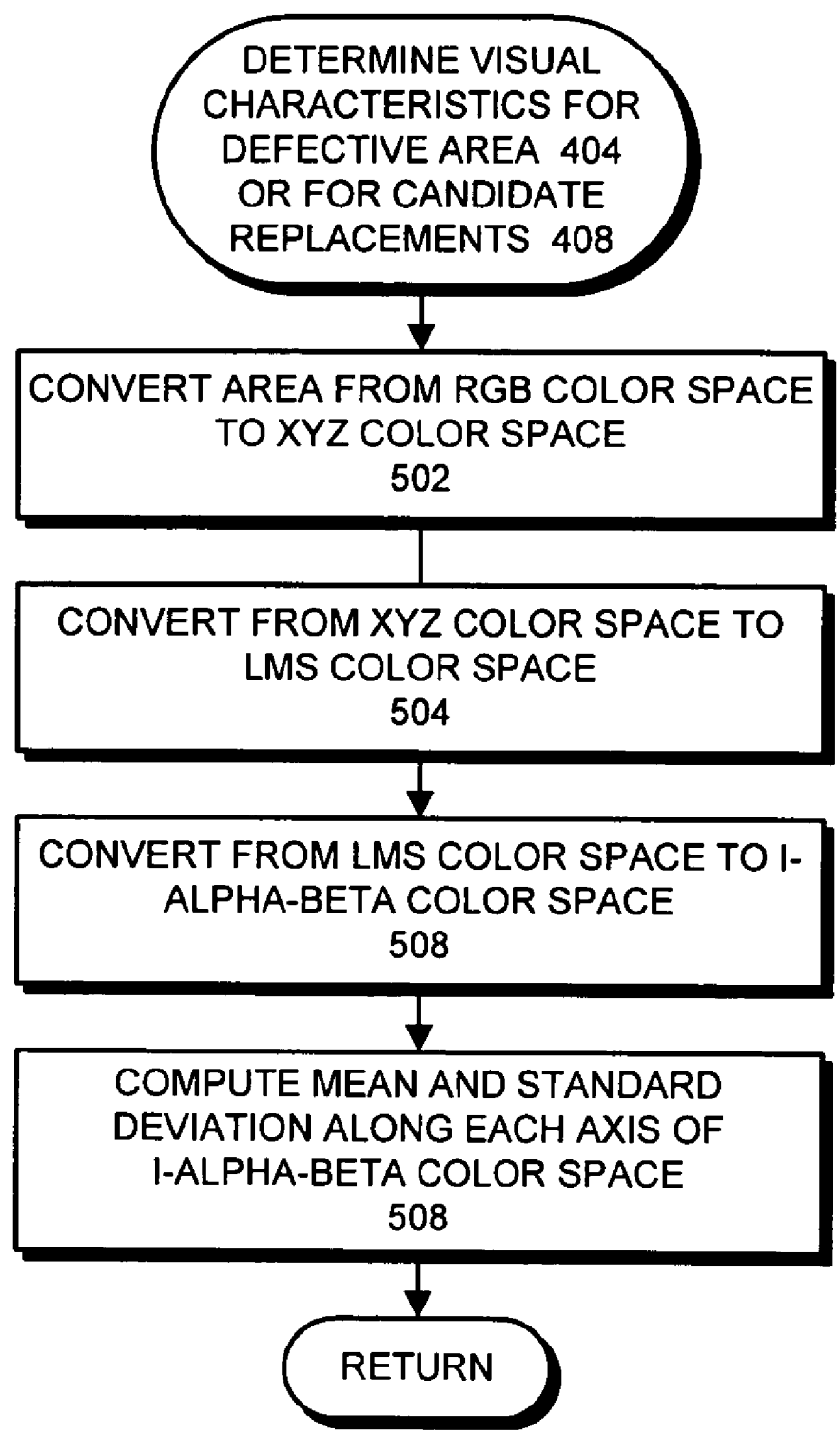
FIG. 5 presents a flow chart illustrating how visual characteristics of the defective are (or a candidate replacement) are computed in accordance with an embodiment of the present invention.

FIG. 5 presents a flow chart illustrating how visual characteristics of the defective are (or a candidate replacement) are computed in accordance with an embodiment of the present invention. The system first converts the area-to-be-characterized (the defective area or the candidate replacement area) from a source color space, such as the Red-Green-Blue (RGB) color space, to the XYZ color space (step 502). This can be accomplished by using the Adobe Color Engine (ACE) library function.

The system then converts form XYZ color space to LMS color space using the following equations (step 504):

$$L=0.3897*X+0.6890*Y-0.0787*Z;$$

$$M=-0.2298*X+1.1834*Y+0.0464*Z; \text{ and}$$

$$S=Z.$$

Next, the system converts form LMS color space to l-alpha-beta color space using the following equations (step 506):

$$l=1/\text{sqrt}(3)*(\log(L)+\log(M)+\log(S));$$

$$a=1/\text{sqrt}(6)*(\log(L)+\log(M)-2*\log(S)); \text{ and}$$

$$b=1/\text{sqrt}(2)*(\log(L)+\log(M)).$$

For a more complete description of the l-alpha-beta color space, see Daniel L. Ruderman, Thomas W. Cronin and Chuan-Chin Chiao, "Statistics of Cone Responses to Natural Images: Implications for Visual Coding," J. Opt. Soc. Am. A 15:2036-2045.

Note that the source color space can alternatively be the CMYK color space or the Grayscale color space and the ultimate target color space can alternatively be the LAB color space. In each of these alternative cases, the conversion operations are likely to be different than the operations described above. For example, there exist ACE library functions to directly convert CMYK or RGB images to LAB images. Furthermore, while converting a Grayscale image to an l-alpha-beta image, the Grayscale image can be treated as an l-alpha beta image with just an "l" channel.

Once the area-to-be-characterized is in the l-alpha-beta color space, the system computes a mean value and a standard deviation for the pixels in the area-to-be-characterized along each axis of the l-alpha-beta color space (step 508).

These mean values and standard deviations are subsequently used to perform matching operations to select a candidate replacement for the defective area.

In one embodiment of the present invention, the degree of matching along the "l" color axis is given more weight than the degree of matching along the alpha color axis or the beta color axis.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically locating a source point within an image for an image-retouching tool, comprising:
   receiving the image, wherein the image includes a defective area;
   determining visual characteristics for the defective area;
   searching around the defective area to identify a plurality of candidate replacements for the defective area, wherein each of the candidate replacements comprises a sub-region of the image, wherein each sub-region comprises a respective plurality of pixels;
   determining visual characteristics for the candidate replacements; and
   comparing visual characteristics of the defective area with visual characteristics for the candidate replacements to select one of the candidate replacements to be used as the source point from which the plurality of pixels in the selected candidate replacement can be copied by the image-retouching tool.

2. The method of claim 1, wherein determining visual characteristics for the defective area involves computing a mean value and a standard deviation along each axis of a color space for pixels in the defective area.

3. The method of claim 2,
wherein the color space is the 1-alpha-beta color space (or the LAB color space); and
wherein the method further comprises converting the defective area from a source color space (such as the RGB color space, the CMYK color space or the Gray-scale color space) to the 1-alpha-beta color space (or the LAB color space) before the mean values and standard deviations are computed.

4. The method of claim 1, wherein comparing visual characteristics of the defective area with visual characteristics of the candidate replacements involves performing an F-test to compare standard deviations for the visual characteristics being compared.

5. The method of claim 1, wherein comparing visual characteristics of the defective area with visual characteristics of the candidate replacements involves performing a T-test to determine whether visual characteristics being compared have significantly different mean values.

6. The method of claim 1, wherein identifying candidate replacements involves filtering out candidate replacements having mean values which do not substantially match the mean value for the defective area, whereby subsequent comparison operations can be avoided for candidate replacements which have been filtered out.

7. The method of claim 1, wherein searching around the defective area to identify candidate replacements involves examining candidate replacements in a region bounding the defective area.

8. The method of claim 1, wherein determining the visual characteristics for the defective area involves excluding defects from the defective area while determining the visual characteristics.

9. The method of claim 1, wherein the image-retouching tool is a clone stamp tool, which allows a user to copy pixels from a source point in the image to a destination point in the image.

10. The method of claim 1, wherein the image-retouching tool is a healing brush, which allows a user to copy pixels from a source point in the image to a destination point in the image, and which additionally ensures that the copied pixels blend seamlessly with surrounding pixels at the destination point.

11. A computer-readable storage device storing instructions that when executed by a computer cause the computer to perform a method for automatically locating a source point within an image for an image-retouching tool, the method comprising:
receiving the image, wherein the image includes a defective area;
determining visual characteristics for the defective area;
searching around the defective area to identify a plurality of candidate replacements for the defective area, wherein each of the candidate replacements comprises a sub-region of the image, wherein each sub-region comprises a respective plurality of pixels;
determining visual characteristics for the candidate replacements; and
comparing visual characteristics of the defective area with visual characteristics for the candidate replacements to select one of the candidate replacements to be used as the source point from which the plurality of pixels in the selected candidate replacement can be copied by the image-retouching tool.

12. The computer-readable storage device of claim 11, wherein determining visual characteristics for the defective area involves computing a mean value and a standard deviation along each axis of a color space for pixels in the defective area.

13. The computer-readable storage device of claim 12,
wherein the color space is the 1-alpha-beta color space (or the LAB color space); and
wherein the method further comprises converting the defective area from a source color space (such as the RGB color space, the CMYK color space or the Gray-scale color space) to the 1-alpha-beta color space (or the LAB color space) before the mean values and standard deviations are computed.

14. The computer-readable storage device of claim 11, wherein comparing visual characteristics of the defective area with visual characteristics of the candidate replacements involves performing an F-test to compare standard deviations for the visual characteristics being compared.

15. The computer-readable storage device of claim 11, wherein comparing visual characteristics of the defective area with visual characteristics of the candidate replacements involves performing a T-test to determine whether visual characteristics being compared have significantly different mean values.

16. The computer-readable storage device of claim 11, wherein identifying candidate replacements involves filtering out candidate replacements having mean values which do not substantially match the mean value for the defective area, whereby subsequent comparison operations can be avoided for candidate replacements which have been filtered out.

17. The computer-readable storage device of claim 11, wherein searching around the defective area to identify candidate replacements involves examining candidate replacements in a region bounding the defective area.

18. The computer-readable storage device of claim 11, wherein determining the visual characteristics for the defective area involves excluding defects from the defective area while determining the visual characteristics.

19. The computer-readable storage device of claim 11, wherein the image-retouching tool is a clone stamp tool, which allows a user to copy pixels from a source point in the image to a destination point in the image.

20. The computer-readable storage device of claim 11, wherein the image-retouching tool is a healing brush, which allows a user to copy pixels from a source point in the image to a destination point in the image, and which additionally ensures that the copied pixels blend seamlessly with surrounding pixels at the destination point.

21. An apparatus that automatically locates a source point within an image for an image-retouching tool, comprising:
a receiving mechanism configured to receive an image, wherein the image includes a defective area;
a characteristics-determining mechanism configured to determine visual characteristics for the defective area;
a searching mechanism configured to search around the defective area to identify a plurality of candidate replacements for the defective area, wherein each of the candidate replacements comprises a sub-region of the image, wherein each sub-region comprises a respective plurality of pixels;

wherein the characteristics-determining mechanism is also configured to determine visual characteristics for the candidate replacements; and a selection mechanism configured to compare visual characteristics of the defective area with visual characteristics for the candidate replacements to select one of the candidate replacements to be used as the source point from which the plurality of pixels in the selected candidate replacement can be copied by the image-retouching tool.

* * * * *